(12) United States Patent
Scott

(10) Patent No.: US 9,731,565 B2
(45) Date of Patent: Aug. 15, 2017

(54) BEAD BREAKER TOOL

(75) Inventor: Steven Richard Scott, Los Gatos, CA (US)

(73) Assignee: Motion Pro, Inc., Loomis, CA (US)

( * ) Notice: Subject to any disclaimer, the term of this patent is extended or adjusted under 35 U.S.C. 154(b) by 741 days.

(21) Appl. No.: 13/553,747

(22) Filed: Jul. 19, 2012

(65) Prior Publication Data

US 2013/0068396 A1 Mar. 21, 2013

Related U.S. Application Data

(60) Provisional application No. 61/537,420, filed on Sep. 21, 2011.

(51) Int. Cl.
*B60C 25/02* (2006.01)
*B60C 25/01* (2006.01)
*B60C 25/04* (2006.01)

(52) U.S. Cl.
CPC ............ *B60C 25/02* (2013.01); *B60C 25/015* (2013.01); *B60C 25/04* (2013.01)

(58) Field of Classification Search
USPC .................................. 157/1.3, 1.43, 1.49, 11
See application file for complete search history.

(56) References Cited

U.S. PATENT DOCUMENTS

| | | | | |
|---|---|---|---|---|
| 1,098,488 A * | 6/1914 | Dyar | ............................ | 157/1.22 |
| 2,344,704 A | 3/1944 | Krantz | | |
| D142,931 S * | 11/1945 | Bailey | .............................. | D8/31 |
| 2,518,114 A * | 8/1950 | Barber | ......................... | 157/1.17 |
| 2,571,517 A * | 10/1951 | Aycock | ........................ | 157/1.17 |
| 2,822,211 A * | 2/1958 | Miller | ............................ | 294/131 |
| 6,684,927 B1 * | 2/2004 | Kliskey | ........................... | 157/1.3 |
| 7,267,155 B2 * | 9/2007 | Brahler, II | ..................... | 157/1.17 |

FOREIGN PATENT DOCUMENTS

| | | |
|---|---|---|
| DE | 728650 C | 12/1942 |
| FR | 1143608 A | 10/1957 |

* cited by examiner

*Primary Examiner* — Larry E Waggle, Jr.
*Assistant Examiner* — Danny Hong
(74) *Attorney, Agent, or Firm* — Larry B. Guernsey; Patent Law Office of Larry Guernsey

(57) ABSTRACT

A bead breaker tool includes an upper member and a lower member, where the upper member and the lower member are interleaved together to make a lever assembly. The upper member and lower member are detachable from each other, and the upper and lower members are configured as tire irons. Also, the handles of the tire irons may include crossguards.

10 Claims, 9 Drawing Sheets

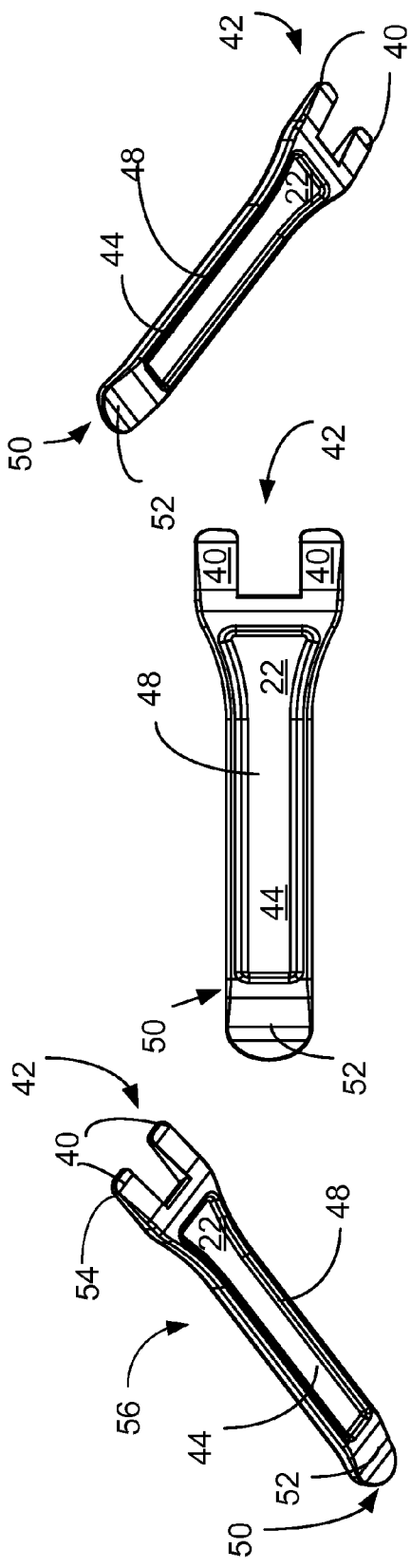
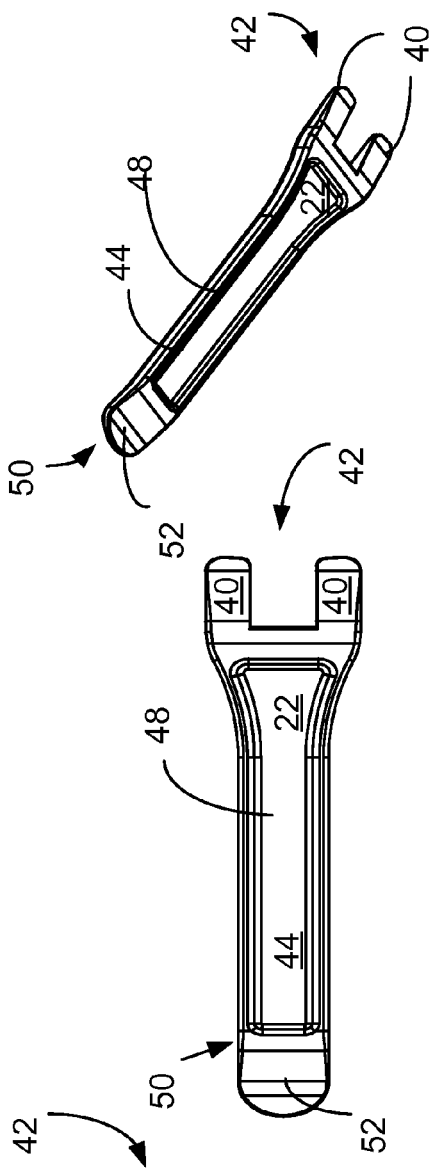
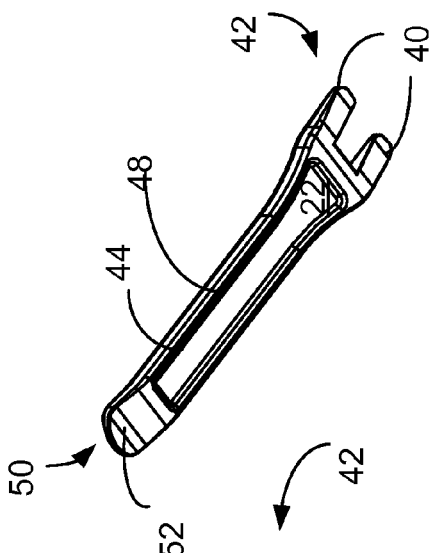
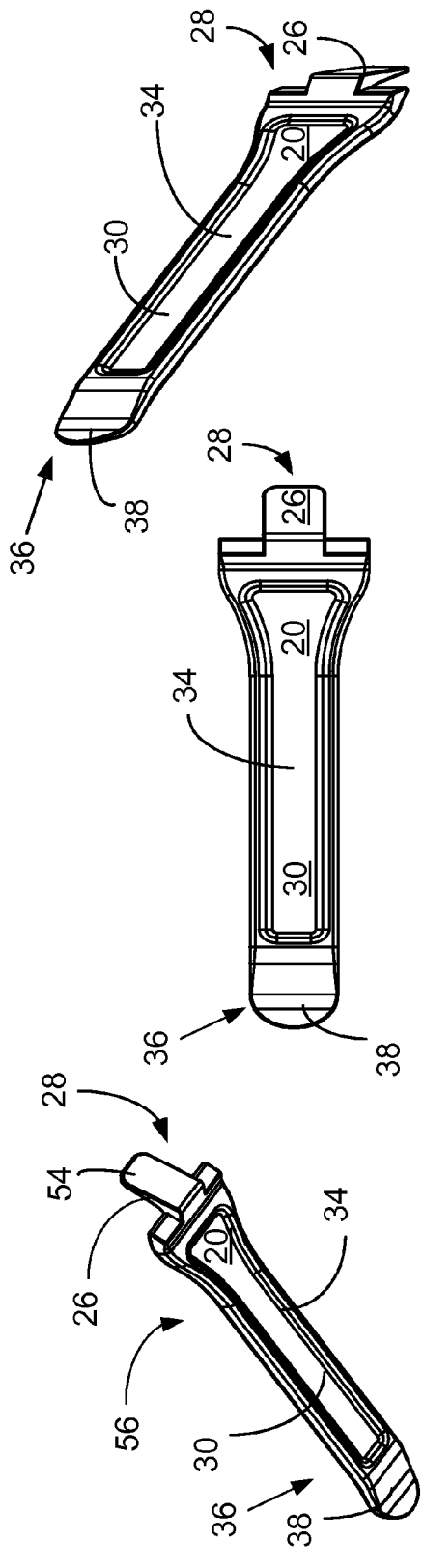
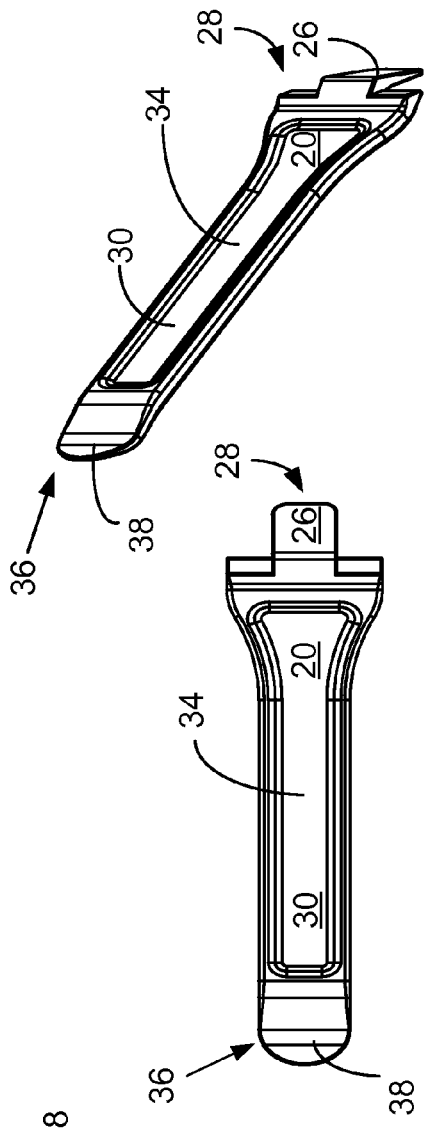
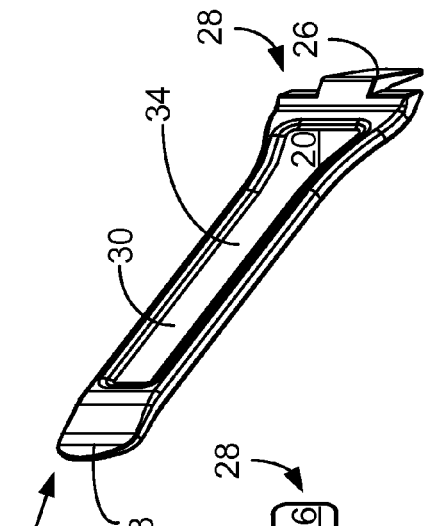

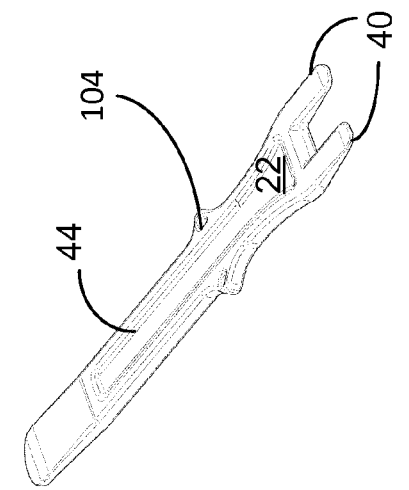
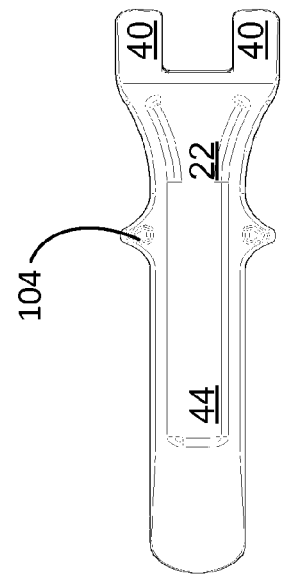
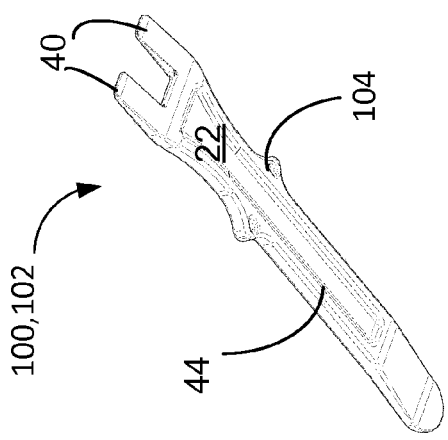
FIGURE 9A  FIGURE 9B  FIGURE 9C
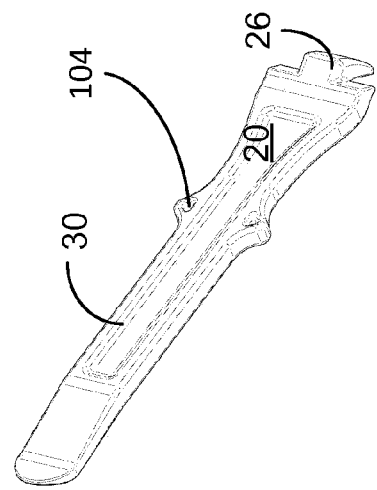
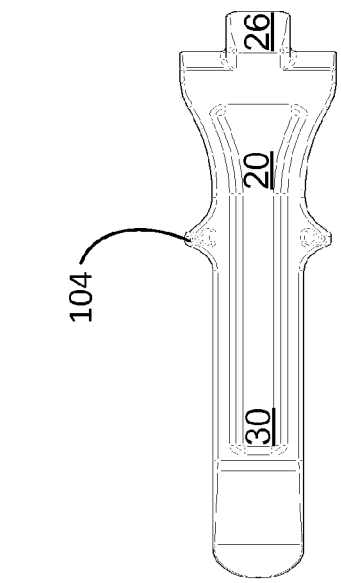
FIGURE 10A  FIGURE 10B  FIGURE 10C

BEAD BREAKER TOOL

The following is a non-provisional patent application which claims priority to provisional application 61/537,420 filed Sep. 21, 2011, by the same inventor.

TECHNICAL FIELD

The present invention relates generally to devices for repairing mechanical parts and more particularly to tools for servicing or replacing the tire in the wheel of a motorcycle.

BACKGROUND ART

When a tire is installed onto a rim and inflated it will "seat" onto the rim. The edge of a tire that sits on the wheel is called the tire bead. Wheels for cars, bicycles and motorcycles are generally made with a small slot or groove for the tire bead to sit in. Air pressure within the tire keeps the bead in this groove when the tire is properly inflated. When a tire is being replaced on a wheel, there is the problem of sealing or setting the bead, because the tire will not inflate properly if the incoming air can escape. For this reason, sometimes some sort of sealant may be used to ensure that the bead is properly sealed.

When a tire becomes damaged and must be replaced, the tire must be released from the wheel, and the bead must be "broken". In breaking the bead, care must be taken that the wheel not be damaged. Some wheels are very expensive, and if a sharp implement is used, such as a knife or screwdriver, care must be taken that the implement does not slip and gouge the finish of the wheel. The task can be even more difficult if sealant has been used.

Sometimes there are also raised sections on the wheel rim called a "safety bead" that makes breaking the bead of the tire even more difficult. Safety beads are features on the inside of a rim that help to hold the tire in place in the event that the tire becomes flat during use. Without a safety bead, if the tire were to lose pressure during use, it may fall off the rim and cause a crash.

For these reason, breaking the bead to remove the tire can be difficult.

There are presently tools available that are designed to break the bead of the tire, however, these are generally either too large to carry with the user on a motorcycle and/or very complicated and hard to use. Usually breaking a tire bead would require the use of shop tools, air tools or hydraulics. There are some manual bead breakers on the market but they are generally all very large and are not portable.

Some users resort to the use of screw-drivers or other wedged-shaped objects which are forced between the bead and the wheel, which may be the only tools at hand while on the road. If a screw-driver slips during this process, the wheel rim, which can be very expensive, can be scarred or gouged. Additionally, the tool might pierce the tire or tube, or otherwise cause further damage to the tire or wheel.

Thus, there is a need for a bead breaker tool which provides a portable, inexpensive, tool for breaking the bead, which is safer to use, does not require the use of shop tools, and which greatly reduces the likelihood of damage to those parts which may be very expensive to replace.

DISCLOSURE OF INVENTION

Briefly, one preferred embodiment of the present invention is a bead breaker tool which includes an upper member and a lower member, where the upper member and the lower member are interleaved together to make a lever assembly. The upper member and lower member are detachable from each other, and the upper and lower members are configured as tire irons. These tire irons may include crossguards.

An advantage of the present invention is that it presents a bead breaker tool which is very small and portable and easy to carry on a motorcycle.

Another advantage of the present bead breaker tool is that it requires no shop tools, air tools or hydraulics.

And another advantage of the present bead breaker tool is that it is safer to use, and less likely to slip and damage expensive wheel or tire parts than using screwdrivers or other pointed objects.

A further advantage of the present bead breaker is that it includes a lever mechanism, by which a mechanical advantage is imparted to the user, to lessen the amount of force necessary to break the bead.

A yet further advantage of the present bead breaker is that the tool easily disassembles into two tire irons each of which includes a narrowed tab portion which can be used to further the breaking of the bead, but which does so in a safe manner.

Yet another advantage of the present invention is that it presents a single tool which can take the place of several.

A still further advantage is that an embodiment of the present invention includes tire irons having crossguards which provide improved grip on the handles of the tool.

These and other objects and advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF THE DRAWINGS

The purposes and advantages of the present invention will be apparent from the following detailed description in conjunction with the appended drawings in which:

FIGS. 7a-7c show various views of the upper member of the bead breaker tool of the present invention;

FIGS. 8a-8c show various views of the lower member of the bead breaker tool of the present invention;

FIGS. 9a-9c show various views of the upper member of the second embodiment of the bead breaker tool of the present invention;

FIGS. 10a-10c show various views of the lower member of the second embodiment of the bead breaker tool of the present invention.

DETAILED DESCRIPTION OF THE PREFERRED EMBODIMENTS

The present invention is a bead breaker tool, which will be referred to by the reference number 10, and thus shall be referred to as bead breaker tool 10. A preferred embodiment of the bead breaker tool 10 is illustrated in FIGS. 1-8c.

Figure 1:
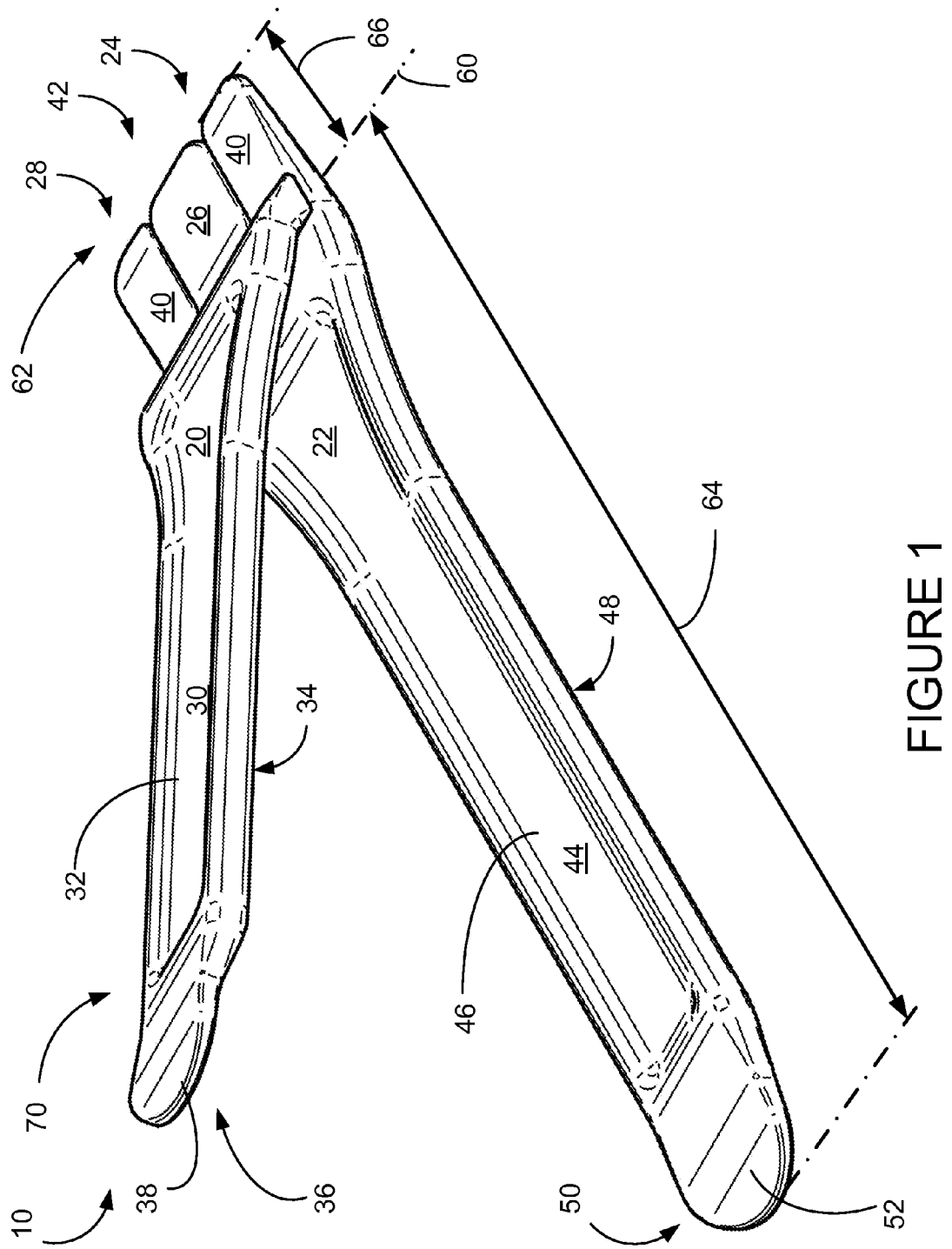
FIG. 1 shows an isometric view of the bead breaker tool of the present invention in an open position.
Figure 2:
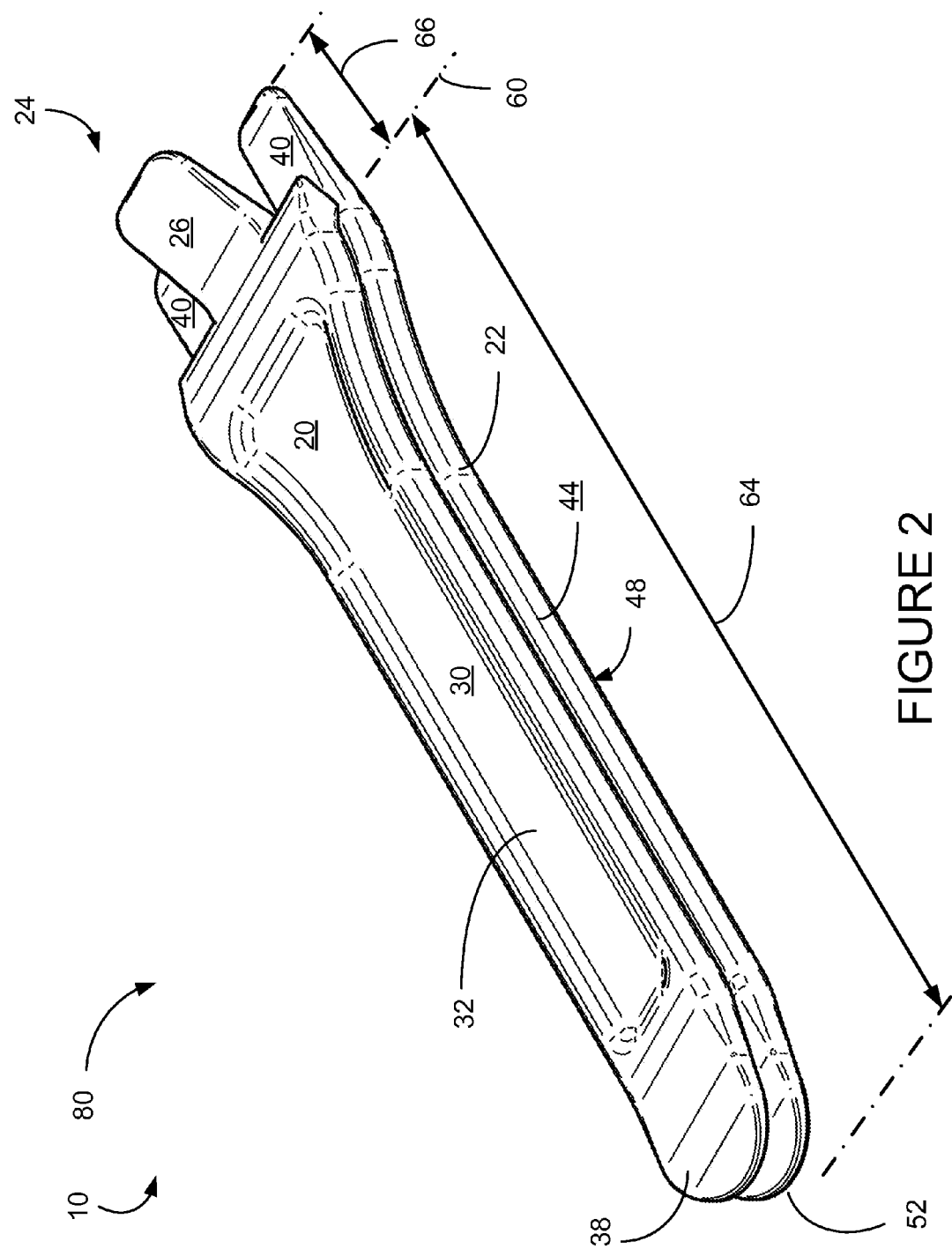
FIG. 2 shows an isometric view of the bead breaker tool of the present invention in a closed position.
Figure 3:
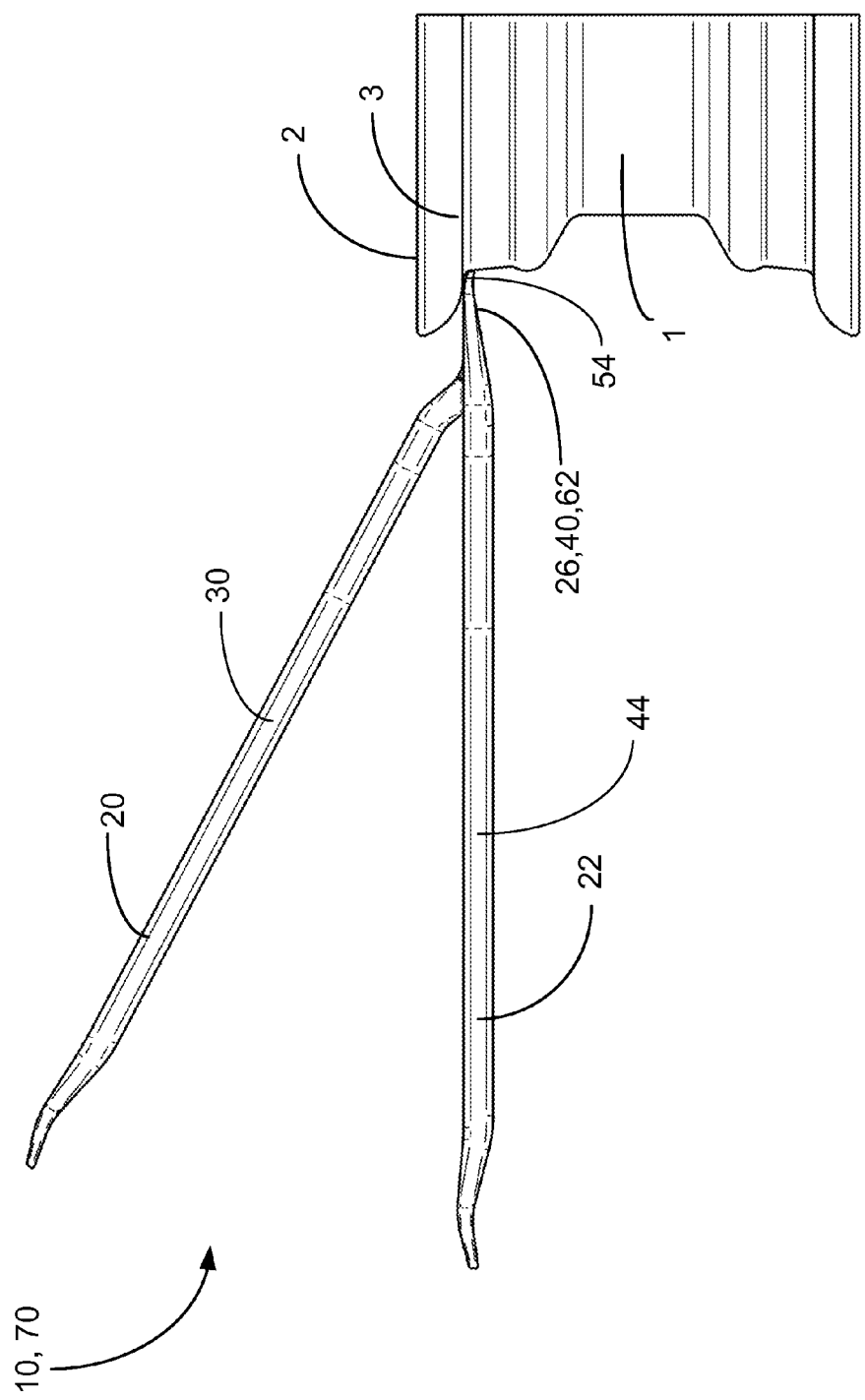
FIG. 3 shows a side view of the bead breaker tool of the present invention in an open position engaged with a tire.
Figure 4:
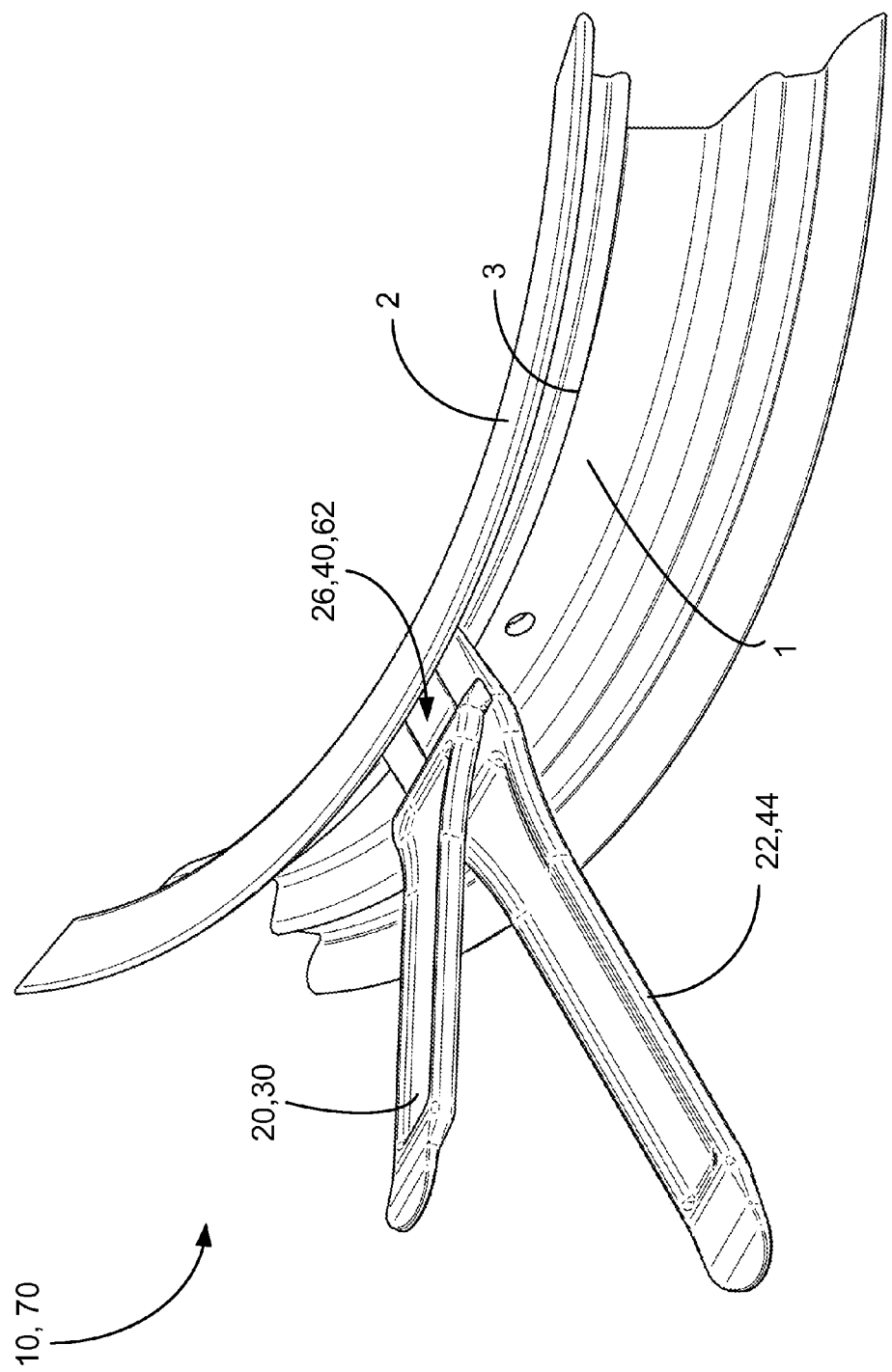
FIG. 4 shows a rear isometric view of the bead breaker tool of the present invention in an open position engaged with a tire.

FIGS. 1-2 show isometric rear views of the bead breaker tool 10 of the present invention in open and closed positions. The bead breaker tool 10 includes an upper member 20 and a lower member 22 which are interleaved together to make a lever assembly 24. The upper member 20 includes an angled finger 26, which is attached at the front end 28 of the upper member 20. The upper member 20 also includes a handle portion 30 having an upper surface 32 and a lower surface 34. The upper member also includes a rear end 36 with a narrowed tab portion 38.

In a similar manner, the lower member 22 includes two angled fingers 40, which are attached at the front end 42 of the lower member 22. The lower member 22 also includes a handle portion 44 having an upper surface 46 and a lower surface 48. The lower member 22 also includes a rear end 50 with a narrowed tab portion 52.

These features are also shown in FIGS. 7a-c and 8a-c.

The upper member 20 and the lower member 22 are positioned so that the angled finger 26 of the upper member 20 is interleaved with the two angled fingers 40 of the lower member 22. There is no hinge element per se, but at the junction of the angled fingers 26, 40, there is a pivot axis 60 about which the handles 30, 44, and the angled fingers 26, 40 approximately rotate. It is to be understood that the pivoting motion may not be purely rotational, and may involve some degree of translational movement away from strict alignment with the pivot axis 60, but the pivoting movement is approximately rotational.

When the bead breaker tool 10 is in open position, as in FIG. 1, the fingers 26, 40 of the upper and lower members 20, 22 are approximately aligned. This allows the fingers 26, 40 to be used as a wedge shaped assembly 62 for insertion. When the bead breaker tool 10 pivots from open position 70 to closed position 80 (FIG. 2) the handle portions 30, 44 of the upper and lower members 20, 22 draw towards each other, as the fingers 26, 40 pivot apart to act as a lever assembly 24 between the tire bead and the wheel. There is a mechanical advantage gained from the ratio of the length 64 of the handles 30, 44 to the pivot axis 60, compared to the length 66 of the fingers 26, 40 to the pivot axis 60. This mechanical advantage greatly aids in the ease of operation of the tool. The bead breaker tool 10 also eases the operation by using gripping power of the users' hands to operate the tool, rather than using twisting motion of the wrist, as when a pry bar or screwdriver were to be inserted and then twisted, as is often the practice in prior operations. If breaking of the bead is particularly stubborn, both hands can be used to squeeze the handles 30, 44 of the tool 10 to apply extra force.

The operation of the bead breaker tool 10 is shown in FIGS. 3-6 with a wheel 1 and a tire 2 having a bead 3. It is to be understood that for purposes of easy viewing, the bulk of the tire is not shown, but it extends further. The bead breaker tool 10 is placed in open position 70, with the handles 30, 44 rotated away from each other and the fingers 26, 40 roughly aligned to make a wedge shaped assembly 62. This wedge-shaped assembly 62, made up of the aligned fingers 26, 40 of the upper and lower members 20, 22, is inserted between the wheel 1 and the tire 2 at the bead 3. The tips 54 of the fingers 26, 40 are also preferably wedge-shaped, but slightly rounded, which aids in the insertion, but serves to protect the tire 2 and wheel 1 from gouging.

Figure 5:
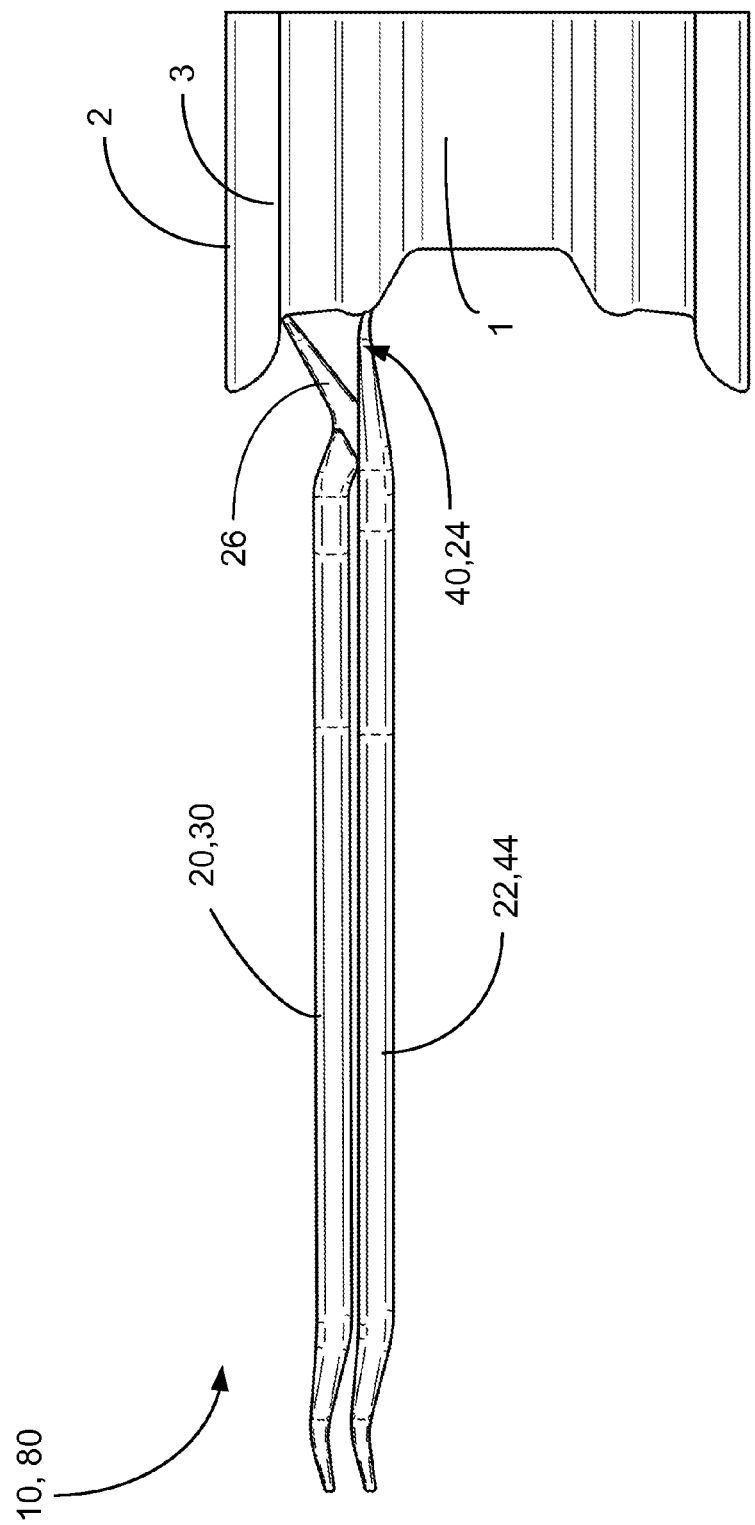
FIG. 5 shows a side view of the bead breaker tool of the present invention in a closed position engaged with a tire.
Figure 6:
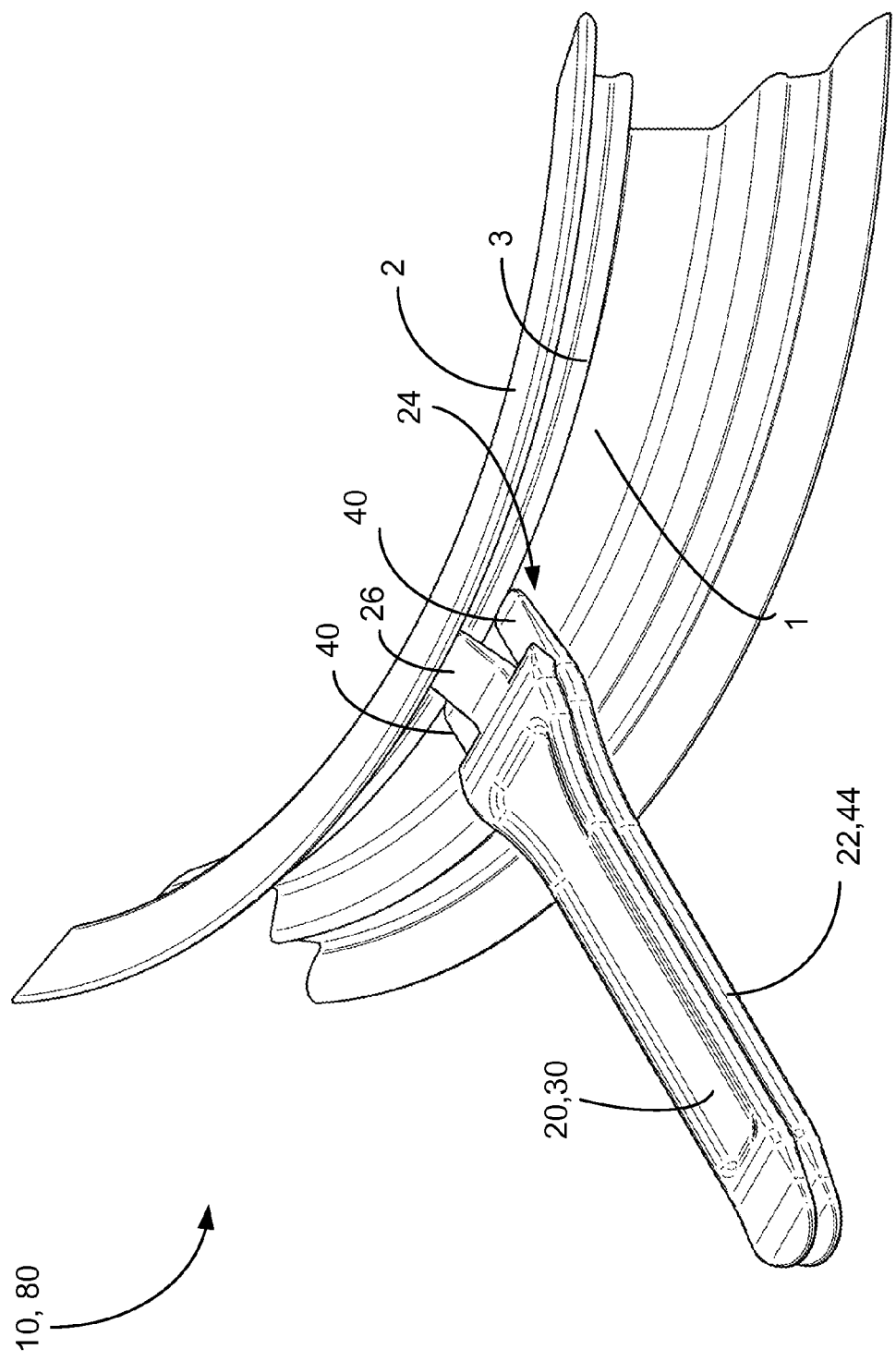
FIG. 6 shows a rear isometric view of the bead breaker tool of the present invention in an closed position engaged with a tire.
Figure 11:
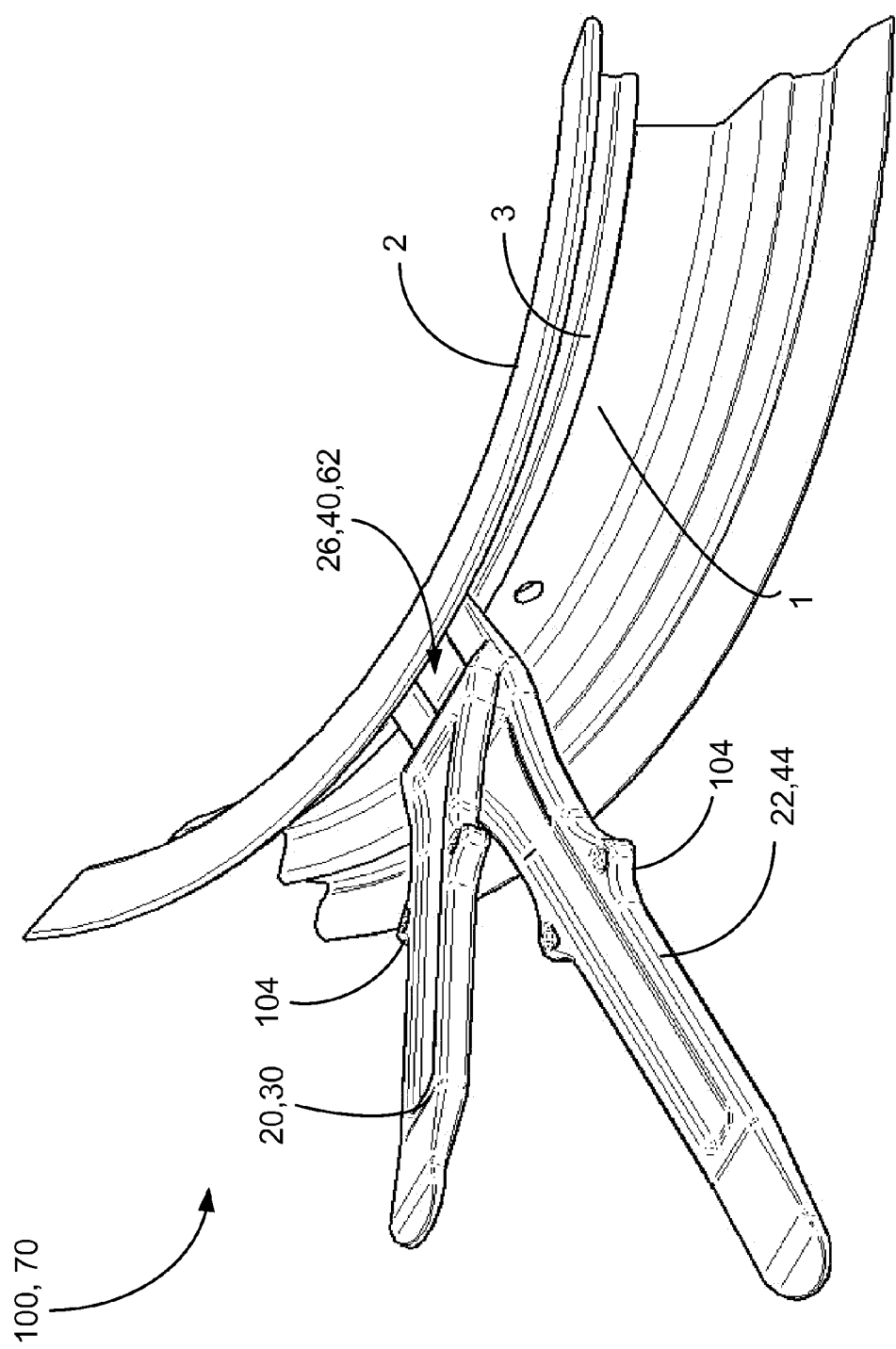
FIG. 11 shows an isometric side view of the bead breaker tool of the present invention in a closed position engaged with a tire.

Once the wedge-shaped assembly 62 is inserted, the handles 30, 44 are squeezed together until the tool is in closed position 80, as shown in FIGS. 5-6. The angled finger 26, pivots away from the lower fingers 40, so that the fingers 26, 40 act as a lever assembly 24, which breaks the bead 3, by prying the edge of the tire 2 away from the wheel 1.

The bead breaker tool 10 does not include a hardware hinge at the pivot axis 60 (see FIG. 1), and is easily disassembled so that the upper member 20 and the lower member 22 can be used independently as tire irons 56 (see FIGS. 7a and 8a). In this state, the respective fingers 26, 40 or the rear tab portions 36, 52 can be inserted into the broken bead and pushed around the circumference to further loosen the tire.

This bead breaker tool 10 thus can do the job of both breaking the bead and removing the tire. The tool 10 incorporates the bead breaker feature into a set of tire irons 56 so the job of removing, and installing a new tire can now all be done with the same tool instead of several.

Thus, this bead breaker tool 10 can be viewed as a set of tire irons 56, as shown in FIGS. 7-8 that have a distinct feature designed into them that will allow the user to use them together in a lever assembly 24 to "break the bead" of the tire. As discussed above, this bead breaker tool 10 works on leverage, so the effort required by the user is quite low. Usually breaking a tire bead would require the use of shop tools, air tools or hydraulics. There are some manual bead breakers on the market but they are generally all very large and are not portable. The present bead breaker tool 10 replaces these bulky or non-portable tools with one which is small, easily portable, and requires very little effort to operate.

FIGS. 9a-9c, 10a-10c and 11 show a second preferred embodiment of the bead breaker tool, which will be referred to as bead breaker with crossguards 100 and tire irons with crossguards 102. Where this second embodiment has features in common with the first embodiment, the same element numbers will be used for these common features.

The bead breaker with crossguards 100 is largely the same as in the first embodiment, with the addition of tabs or crossguards 104 to the handle portions 30, 44 of each individual tire iron 102. There is a fair amount of force required to push the tool into the bead of the rim and the crossguards 104 allow the user to push thumb and index finger against them. These crossguards 104 on the side of the handles 30, 44 are included to give the user something to push against in the direction of the tire rim. Without them, the user has to grip the handles only, and there is nothing to stop the user's hand from sliding along the handle. It is thought that the crossguards provide this embodiment with significant advantages concerning ease of usage and deployment.

While various embodiments have been described above, it should be understood that they have been presented by way of example only, and not limitation.

INDUSTRIAL APPLICABILITY

The present bead breaker tool 10 is well suited generally for use in servicing or replacing the tire in the wheel of a motorcycle.

The operation of the bead breaker tool 10 is shown in FIGS. 3-6 with a wheel 1 and a tire 2 having a bead 3. The bead breaker tool 10 is placed in open position 70, with the handles 30, 44 rotated away from each other and the fingers 26, 40 roughly aligned to make a wedge shaped assembly 62. This wedge-shaped assembly 62, made up of the aligned fingers 26, 40 of the upper and lower members 20, 22, is inserted between the wheel 1 and the tire 2 at the bead 3. The tips 54 of the fingers 26, 40 are also preferably wedge-shaped, but slightly rounded, which aids in the insertion, but serves to protect the tire 2 and wheel 1 from gouging.

Once the wedge-shaped assembly 62 is inserted, the handles 30, 44 are squeezed together until the tool is in closed position 80, as shown in FIGS. 5-6. The angled finger 26 pivots away from the lower fingers 40, so that the fingers 26, 40 act as a lever assembly 24, which breaks the bead 3, by prying the edge of the tire 2 away from the wheel 1.

The bead breaker tool 10 does not include a hardware hinge at the pivot axis 60, and is easily disassembled so that the upper member 20 and the lower member 22 can be used independently as tire irons 56. In this state, the respective fingers 26, 40 or the rear tab portions 36, 52 can be inserted into the broken bead and pushed around the circumference to further loosen the tire.

This bead breaker tool 10 thus can do the job of both breaking the bead and removing the tire. The tool 10 incorporates the bead breaker feature into a set of tire irons 56 so the job of removing, and installing a new tire can now all be done with the same tool instead of several.

Thus, this bead breaker tool 10 can be viewed as a set of tire irons 56 that have a distinct feature designed into them that will allow the user to use them together in a lever assembly 24 to "break the bead" of the tire. As discussed above, this bead breaker tool 10 works on leverage, so the effort required by the user is quite low. Usually breaking a tire bead would require the use of shop tools, air tools or hydraulics. There are some manual bead breakers on the market but they are generally all very large and are not portable. The present bead breaker tool 10 replaces these bulky or non-portable tools with one which is small, easily portable, and requires very little effort to operate.

A second preferred embodiment of the bead breaker tool includes the addition of tabs or crossguards 104 to the handle portions 30, 44 of each individual tire iron 102. There is a fair amount of force required to push the tool into the bead of the rim and the crossguards 104 allow the user to push thumb and index finger against them. These crossguards 104 on the side of the handles 30, 44 are included to give the user something to push against in the direction of the tire rim. Without them, the user has to grip the handles only, and there is nothing to stop the user's hand from sliding along the handle. It is thought that the crossguards provide this embodiment with significant advantages concerning ease of usage and deployment.

For the above, and other, reasons, it is expected that the bead breaker tool 10 of the present invention will have widespread industrial applicability. Therefore, it is expected that the commercial utility of the present invention will be extensive and long lasting.

The invention claimed is:

1. A bead breaker tool, comprising:
   an upper member; and
   a lower member, where said upper member and said lower member which are interleaved together to make a lever assembly, where said upper member and said lower member are detachable from each other, where said detached upper member and said lower member are configured as tire irons, wherein said upper member and said lower member both have rear ends and front ends, where said front ends are formed as fingers, wherein said lever assembly has an open position and a closed position and when said lever assembly is in said closed position, said fingers align to form a narrow wedge.

2. The bead breaker tool of claim 1, wherein said lever assembly forms a wedge shaped assembly when said lever assembly is in said closed position.

3. The bead breaker tool of claim 1, wherein:
   said upper member has a finger which is an angled finger.

4. The bead breaker tool of claim 1, wherein:
   said rear ends of said upper and lower members include a narrowed tab portion.

5. The bead breaker tool of claim 1, wherein said upper member and said lower member further comprise:
   handle portions which include crossguards.

6. A bead breaker tool, comprising: an upper member; and
   a lower member, where said upper member and said lower member are interleaved together to make a lever assembly, wherein said upper member and said lower member both have front ends which are formed as fingers, wherein said lever assembly has an open position and a closed position and when said lever assembly is in said closed position, said fingers align to form a narrow wedge, and wherein said upper member and said lower member further comprise handle portions which include crossguards.

7. The bead breaker tool of claim 6, wherein:
   said upper member has a finger which is an angled finger.

8. The bead breaker tool of claim 6, wherein:
   said upper member and said lower member are detachable from each other.

9. The bead breaker tool of claim 8, wherein:
   said detached upper member and said lower member are formed as tire irons.

10. The bead breaker tool of claim 6, wherein said upper member and said lower member include rear ends which each include a narrowed tab portion.

* * * * *